Patented Sept. 22, 1925.

1,554,913

UNITED STATES PATENT OFFICE.

WILLIAM P. M. GRELCK, OF ST. PAUL, MINNESOTA.

SELF-PRESERVING STOCK FOOD CONTAINING SPROUTED GRAIN AND PROCESS FOR MAKING THE SAME.

No Drawing.     Application filed November 5, 1924. Serial No. 747,981.

*To all whom it may concern:*

Be it known that I, WILLIAM P. M. GRELCK, a citizen of the United States, residing at St. Paul, in the county of Ramsey and State of Minnesota, have invented new and useful Improvements in Self-Preserving Stock Food Containing Sprouted Grain and Processes for Making the Same.

It is my object to provide a self-preserving stock food containing as its principal ingredient sprouted grain, including the root and leaf sprouts, in fresh, undried condition.

As is well known, malted grain, and particularly the sprouts thereof, when fresh, contain those essential accessory food substances known as vitamines, and also the highly nutritious coarser ingredients of the grain, but as far as applicant is aware no method for preserving such grain and sprouts in a natural undried state has heretofore been devised. It has been necessary for the poultry or other stock raiser, in order to obtain this valuable feed to sprout the grain, a little at a time as he needs it, because such grain quickly spoils by the formation of ferments of a putrefying nature. In my co-pending application for patent filed September 27th, 1923, Serial No. 665,226, I have described and claimed a process and product in which I utilize malted grain to convert starch into maltose and suggest the use of brewer's grain, a by product of the malt beverage manufacturer, as a suitable substitute for shorts or the coarser ingredients of the grain. The present invention is an improvement upon the invention of said application, filed September 27th, 1923.

There are a number of kinds of grain, such as barley, wheat, oats and whole rice, which are suitable for use in the manufacture of my improved food product, but under present conditions, I prefer to use barley. To proceed upon a commercial scale, I first take a thousand pounds of barley and steep it in water for from 48 to 60 hours, and then place it upon a floor and sprout it in the manner well known in the manufacture of malt. When the roots and leaves of the grain are well developed so that the endosperm is soft and can be easily crushed between the fingers, sufficient diastase will have developed. The sprouted grain is then macerated and about 16,800 pounds of water is added. The mass thus produced is maintained at a temperature between 135 and 160 degrees Fahrenheit until the diastase in the sprouted grain has converted the starchy constituents into maltose. Any well known test, such as the iodine test for starch, may be applied to determine when the conversion is complete. A liquor containing approximately four per cent maltose is thus produced.

The tubs or vats in which the conversion to maltose is carried out, are preferably constructed with a foraminous diaphragm or double bottom therein, so that when the conversion is complete, the liquor may be readily drawn off, leaving the grain hulls and sprouts in the vats. The liquor is thus drawn off and the sprouts and grain hulls are passed through attrition mills to produce a custard-like paste. To this paste sufficient lactic acid is added to preserve the product in air tight containers. From 4 to 6 per cent of lactic acid is sufficient to preserve the product, which is a semi-fluid substance, containing about 30 per cent solid matter, including the coarse, nutritious, outer portions of the grain and the root and leaf sprouts.

The method of supplying the preservative quantity of lactic acid in my product may be varied according to the material available, but where there is no immediate market for the maltose liquor by-product produced in the above described process, I prefer to convert the maltose in said liquor to lactic acid by the method described in my above mentioned application, filed September 27, 1923. Where the maltose liquor can be otherwise utilized, I prefer to proceed as follows to produce the lactic acid.

Either milk whey, which is obtainable as a by product of the cheese manufacturer, buttermilk, skimmed, or even whole milk, may be utilized. About two thousand pounds of such whey, or other lactic fluid, containing sugar of milk, is soured by first adding a lactic acid bacteria starter, and then while maintaining a temperature of from 70 to 100 degrees Fahrenheit, the bacteria is allowed to generate and multiply to the fullest possible extent. In this manner about two per cent of lactic acid is developed in the whey, which is now added to the grain and sprout mash and evaporated in a partial vacuum at about 140 degrees Fahrenheit to reduce the water content to about two-thirds of the entire mass of the finished product. As will now be evident, when about 1300 lbs. of the water has been evaporated, 1000 lbs. of the semi-solid stock food containing about four per cent lactic acid will be ready for packing in barrels or other air tight containers.

Having described my invention what I claim as new and desire to protect by Letters Patent is:

1. A self preserving wet food product comprising malted grain, including the sprouts thereof in fresh, undried state, impregnated with a preservative quantity of lactic acid.

2. A self preserving wet food product comprising malted grain, including the sprouts thereof in fresh, uncooked state, crushed to a pasty consistency and impregnated with a preservative quantity of lactic acid.

3. A self preserving, semi-liquid food product, containing as its principal ingredient, fresh malted grain, including the fresh sprouts thereof, impregnated with, from 4 to 6% by weight of lactic acid.

4. The process of preparing a food product which comprises sprouting a quantity of grain and developing diastase therein, then adding water thereto and converting a substantial part of the starchy constituents to maltose, then drawing off the maltose liquor so produced, subsequently crushing the grain hulls and sprouts while fresh to form a mash, and finally adding a preservative quantity of lactic acid to said mash.

5. The process of preparing a food product which comprises sprouting a quantity of grain and developing diastase therein, then adding water thereto and converting a substantial part of the starchy constituents to maltose, then drawing off the maltose liquor so produced, subsequently crushing the grain hulls and sprouts while fresh to form a mash, and finally adding about 4 per cent of lactic acid to said mash, together with sufficient liquid to produce a semi-solid food which is self-preserving when stored in air tight containers.

6. The process of preparing a food product which comprises sprouting a quantity of grain, then crushing the grain and sprouts while fresh to form a mash, and finally adding a preservative quantity of lactic acid to said mash.

In testimony whereof, I have hereunto signed my name to this specification.

WILLIAM P. M. GRELCK.